(12) United States Patent
Yang

(10) Patent No.: US 10,317,977 B2
(45) Date of Patent: Jun. 11, 2019

(54) DISPLAYING AREA ADJUSTMENT

(71) Applicants: Intel Corporation, Santa Clara, CA (US); Wenlong Yang, Shanghai (CN)

(72) Inventor: Wenlong Yang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 384 days.

(21) Appl. No.: 13/997,672

(22) PCT Filed: Dec. 28, 2012

(86) PCT No.: PCT/CN2012/087795
§ 371 (c)(1),
(2) Date: Jun. 25, 2013

(87) PCT Pub. No.: WO2014/101085
PCT Pub. Date: Jul. 3, 2014

(65) Prior Publication Data
US 2014/0189583 A1 Jul. 3, 2014

(51) Int. Cl.
*G06F 1/32* (2019.01)
*G06F 1/3234* (2019.01)
(Continued)

(52) U.S. Cl.
CPC .......... *G06F 1/3234* (2013.01); *G06F 1/3206* (2013.01); *G06F 1/3265* (2013.01);
(Continued)

(58) Field of Classification Search
CPC ....................................................... G06F 1/32
(Continued)

(56) References Cited

U.S. PATENT DOCUMENTS

| 5,598,565 A | 1/1997 | Reinhardt |
| 2003/0071805 A1* | 4/2003 | Stanley ................ 345/211 |

(Continued)

FOREIGN PATENT DOCUMENTS

| CN | 101950546 | 1/2011 |
| CN | 102348044 | 2/2012 |

(Continued)

OTHER PUBLICATIONS

International Searching Authority, "Notification of Transmittal of the International Search Report and the Written Opinion of the International Searching Authority," dated Oct. 3, 2013, in International application No. PCT/CN2012/087795.

(Continued)

*Primary Examiner* — Tadesse Hailu
*Assistant Examiner* — Darrin Hope
(74) *Attorney, Agent, or Firm* — Trop, Pruner & Hu, P.C.

(57) ABSTRACT

In an embodiment of the invention, a portable electronic device may conserve power while in a normal power mode. The display screen of the portable electronic device may be switched from an original screen mode to an adjusted screen mode. In adjusted screen mode, the display screen may display an adjustable displaying area that is reduced from an original size and it may include an inactive area sized to reduce display consumption of power. An original interface, or a portion thereof, may be displayed in the adjustable displaying area. Other embodiments are described and claimed.

23 Claims, 10 Drawing Sheets

(51) Int. Cl.
*G06F 1/3206* (2019.01)
*G06F 3/0488* (2013.01)
*G06F 3/14* (2006.01)

(52) U.S. Cl.
CPC ............ *G06F 3/04883* (2013.01); *G06F 3/14* (2013.01); *G06F 2203/04808* (2013.01); *G09G 2310/04* (2013.01); *G09G 2330/021* (2013.01); *G09G 2340/045* (2013.01); *G09G 2358/00* (2013.01); *Y02D 10/153* (2018.01)

(58) Field of Classification Search
USPC ........................................................ 715/800
See application file for complete search history.

(56) References Cited

U.S. PATENT DOCUMENTS

| | | |
|---|---|---|
| 2003/0146897 A1 | 8/2003 | Hunter |
| 2006/0132474 A1* | 6/2006 | Lam .................... G09G 3/20 345/204 |
| 2006/0146042 A1 | 7/2006 | Ravichandran et al. |
| 2007/0226522 A1 | 9/2007 | Aleksic et al. |
| 2008/0122796 A1* | 5/2008 | Jobs .................... G06F 3/0488 345/173 |
| 2009/0006991 A1* | 1/2009 | Lindberg et al. ............. 715/763 |
| 2011/0175930 A1* | 7/2011 | Hwang et al. ................ 345/629 |
| 2012/0084701 A1* | 4/2012 | Sirpal ................... G06F 1/1616 715/773 |
| 2012/0268378 A1 | 10/2012 | Tokutake |
| 2012/0315960 A1* | 12/2012 | Kim ............................ 455/574 |
| 2014/0092140 A1* | 4/2014 | Wadhwa et al. .............. 345/660 |
| 2014/0104082 A1 | 4/2014 | Nakamura et al. |
| 2014/0157424 A1* | 6/2014 | Lee ........................ G06F 21/74 726/26 |

FOREIGN PATENT DOCUMENTS

| | | |
|---|---|---|
| JP | 1999187290 | 9/1999 |
| JP | 2001273070 | 10/2001 |
| WO | 2013042161 | 3/2013 |

OTHER PUBLICATIONS

European Patent Office, Extended European Search Report dated Jul. 1, 2016 in European Patent Application No. 12890942.1.
Japan Patent Office, Office Action dated Jul. 26, 2016 in Japanese Patent Application No. 2015546803.

* cited by examiner

DISPLAYING AREA ADJUSTMENT

BACKGROUND

Battery-powered portable electronic devices are useful only as long as the battery has enough charge. Device features that are active or running, however, may affect how long the battery stays charged; some features may consume more battery power than others may. If battery-consuming features are enabled, the battery may need to be recharged more frequently. If, however, such features are not enabled a user may lose a benefit of the portable electronic device. To avoid complete loss of such a benefit, the user may resort to frequent enabling and disabling of a particular device feature. For example, a global positioning system (GPS) may cause accelerated drain of battery charge. Thus, the portable electronic device user may simply turn off the GPS feature to prolong the time before the battery needs to be recharged. If the GPS is turned off, the user may still use the portable electronic device for most of its intended purposes. The user, however, may not be able to take advantage of GPS capabilities such as finding a lost device and other tracking-type services. The display of a portable electronic device is another feature that is a big consumer of battery charge. This may be exacerbated if the device display is relatively large compared to the device size as a whole. Since a user typically interacts with the portable electronic device through an interface displayed on the display screen, the user cannot simply turn off the display and still use other features of the portable electronic device. Thus, to save battery, the user may turn the display completely off or dim the light for the entire display. But to use the portable electronic device, it may be necessary to turn the display back on, increase the intensity of the display light, or both.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

In the following description, numerous specific details are set forth but embodiments of the invention may be practiced without these specific details. Well-known circuits, structures, and techniques have not been shown in detail to avoid obscuring an understanding of this description. "An embodiment", "various embodiments", and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally or spatially, or in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

An embodiment of a portable electronic device may conserve power while in a normal operating mode by switching from an original screen mode to an adjusted screen mode. While in adjusted screen mode, the device display may include an adjustable displaying area and an inactive area. An extract from a user interface may be displayed in the adjustable displaying area and the adjustable displaying area may be adjusted to occupy less than the entire display screen. Thus, at least a portion of the adjusted displaying area perimeter may be adjacent to the inactive area, which may extend to the periphery of the display screen. Thus, the inactive area may fill the portion of the display screen that is not being used to display the extract of the user interface in the adjustable displaying area. The inactive area may use less power than an active area such as the adjustable displaying area or a full-size display screen. Thus, while in the adjusted screen mode, the display may not need to be turned off or entirely dimmed to conserve power and yet allow the user to see and/or use at least a portion of an original interface in the adjusted displaying area.

Figure 1A:
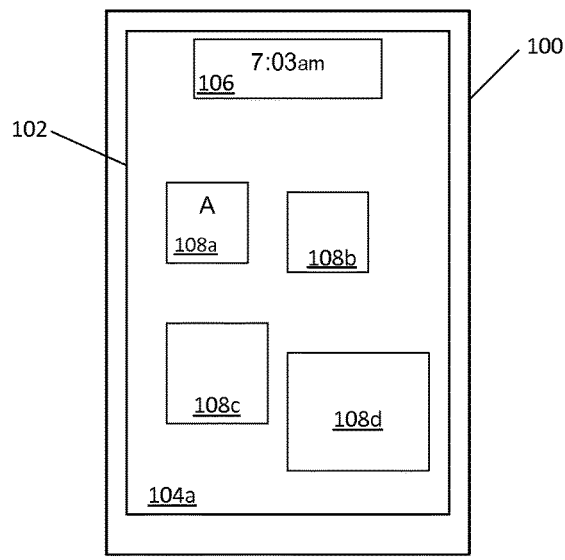
FIG. 1A includes a schematic diagram of an embodiment of the invention.

Referring to FIG. 1A, shown is a portable electronic device (PED) 100 having a display 102. The PED 100 can be any type of portable electronic device such as a mobile telephone (e.g., smartphone), a tablet computer, a laptop computer, an ultrabook, an electronic reader, a gaming system, a music player, a camera, a video recorder, a scanner, a printer, a tool (e.g., a die-cut machine, or other machine or tool having a display screen associated therewith), and the like. Similarly, the display 102 can be any type of display such as a liquid crystal display (LCD), a light emitting diode (LED) display, and/or an organic light emitting diode (OLED) display to name a few general examples. Furthermore, the display 102 may include a touch screen that is sensitive to both single touch and two or more simultaneous touches. The touch screen may be any type of touch screen such as resistive or capacitive (e.g., self, mutual, projected), acoustic wave and/or infrared (IR) sensitive, or having touch sensors.

Still referring to FIG. 1A, PED 100 is shown as it may appear when it is first turned on such as in a standard operating mode. In this operating mode, PED 100 can be in an active power state to enable normal usage (e.g., not in a sleep or a hibernate mode), and display 102 may be on and in an original screen mode (OSM). In OSM, a displaying area such as an original displaying area 104a can be in a default configuration such as occupying all or almost all of display 102 screen. As shown in FIG. 1A, an original interface such as a home screen can be displayed in the displaying area 104a. The original interface shown in FIG. 1A includes a clock area 106 and images 108a, 108b, 108c, and 108d. Each image 108a, 108b, 108c, and 108d may be one of text or a graphic such as, without limitation, an icon, a tile, a button, a menu item, and a photograph. Images 108a, 108b, 108c, and 108d may be the same type of image (e.g., all icons) or different types of images (e.g., tiles, icons, photographs, etc.). The original interface may also include a background such as wallpaper (not shown) as is known in the art. The original user interface shown in FIG. 1A is merely illustrative; embodiments are not limited by the displayed user interface.

FIG. 1B through FIG. 1E illustrate four different examples of display 102 in adjusted screen mode (ASM). Embodiments, however, are not limited to these four examples; a displaying area may be adjusted in numerous different ways to meet a particular user's needs. As shown in FIG. 1B through FIG. 1E, in an embodiment, original size displaying area 104a may be adjusted to the size and position of a reduced size displaying area 104b, 104c, 104d, or 104e. Generally, all or part (i.e., an "extract") of the original user interface shown in original size displaying area 104a may be cut (i.e., extracted) and displayed in reduced size displaying area 104b, 104c, 104d, or 104e. In an embodiment, original size displaying area 104a may automatically resize to frame the extract of the interface, or it may be manually repositioned to frame the extract of the interface.

While in ASM, the frame size displaying area may be further adjusted to manipulate the extract of the original interface. For example, with respect to FIG. 1C, the frame size displaying area (which is the same as original size displaying area 104a) may be reduced to a reduced size displaying area 104c such that the extract of the original user interface is decreased to the same proportion. Likewise, with respect to FIG. 1D, initially the frame size displaying area may frame image 108a as initially extracted from the original user interface. Thereafter, the frame size displaying area framing image 108a may be enlarged to a desired size such as to reduced size displaying area 104d. Alternatively, with respect to FIG. 1E, frame size displaying area framing extracted image 108a may be stretched to span the width of the display 102 screen such as to reduced size displaying area 104e. As such, extracted image 108a may be stretched to the same degree. The frame size displaying area 104b shown in FIG. 1B has been repositioned with respect to an original display position of clock area 106. As the frame size displaying area 104b has not been enlarged, reduced, or stretched is the same as reduced size displaying area 104b. Although not shown, an adjusted displaying area 104b, 104c, 104d, or 104e also may be moved to a different location of display 102 screen. Alternatively, an original user interface may be moved within displaying area 104a before extraction. In this way, the selected extract may already be positioned at the desired screen location. A particular framed displaying area may be repeatedly adjusted and positioned to achieve the desired reduced size and position.

Referring to FIG. 1B through FIG. 1E, inactive area 112 is proximate least a portion of the perimeter of reduced size displaying area 104b, 104c, 104d, or 104e, and extends to the periphery or edge of the display 102 screen. In other words, inactive area 112 corresponds to the part of the display 102 screen that is not displaying an extract of an interface in reduced size displaying area 104b, 104c, 104d, or 104e. Inactive area 112 may be turned off, at rest, or otherwise not available for active use. For an example, in an embodiment, inactive area 112 may be black. But the actual appearance of inactive area 112 may depend on the display type (e.g., LCD, OLED), display design, how inactive area 112 is created, and combinations thereof.

For example, in an embodiment, display 102 may include liquid crystal display (LCD) technology such as thin film transistor (TFT) LCD technology and/or in-plane switching (IPS) LCD technology. Since liquid crystals do not emit light, an LCD display 102 may include a light source such as a backlight or an edge light. A backlight may include one or more display lights such as lamps (e.g., hot or cold cathode fluorescent lamps) or light emitting diodes (LEDs). In an embodiment, the display lights of a backlight may cover all (e.g., full array) or part (e.g., sparse array) of the back of the display screen. In an embodiment, the one or more display lights may be located at the edge of the display to create the edge light. An edge light may be used as an alternative to the backlight or in addition to the backlight.

Generally, and at a very high level, liquid crystals act as a gate that may prevent or variably allow light from the display lights to pass through subpixels (e.g., one each for red, green, and blue). Whether or not light passes through a subpixel that is at rest (e.g., none or little varying electrical charge applied to subpixel transistor) may depend on the design of the LCD.

In an embodiment, pixels and/or subpixels in inactive area 112 may be at rest, receiving little if any electrical charge. Thus, inactive area 112 may be dark if light from display lights is blocked while the pixels/subpixels are at rest. Alternatively, inactive area 112 may be white or another color (depending on how much charge is applied to subpixels) if light from display lights is not blocked while the subpixels are at rest. As such, an embodiment should not be limited to a particular color of inactive area 112. For ease of reference, inactive area 112 is unfilled/white in FIG. 1B through FIG. 1E.

Furthermore, in an embodiment the LCD display lights may be selectively dimmed or turned off to create or augment inactive area 112. Such dimming/turning off may affect the color of inactive area 112 making it appear dark or even black. For example, in an embodiment, the LCD display lights may be a full or scattered array of LEDs. A controller may selectively dim or turn off the LEDs proximate inactive area 112 making inactive area 112 darker than frame or reduced (i.e., adjusted) size displaying area 104b, 104c, 104d, or 104e. The LEDs proximate the adjusted displaying area 104b, 104c, 104d, or 104e, however, may be at the same or similar intensity as in OSM. Thus, if display lights proximate pixels that define inactive area 112 are dimmed or turned off, inactive area 112 may be dark even if resting pixels/subpixels do not block light.

Not all displays require an external light source. For example, displays using organic light emitting diode (OLED) technology do not require a backlight or edge light. OLEDs can be fluorescent, active matrix, phosphorescent, transparent, and combinations thereof. Generally, and at a very high level, OLED pixels emit photons in response to receiving an electrical charge, which is why an external light source is not required for an OLED display. Thus, in an embodiment, inactive area 112 may result from OLED pixels that are at rest, receiving little if any charge. The appearance the inactive area 112 may be a function of what the display 102 screen looks like when OLED pixels are at rest. If no photons are emitted then the inactive area 112 may be dark. In an embodiment, the organic material may be a phosphorescent organic material (e.g., PHOLED). PHOLED displays may consume less power than LCD displays and produce intense color.

Taking the forgoing together, the display 102 may use less power, including battery power, when in ASM than when in OSM, and when the PED 100 is in an standard, normal-use operating mode. Furthermore, the degree to which power is saved may depend on several factors such as display type (e.g., LCD, OLED), external display lights (e.g., type, distribution, selective use), and the size of inactive area 112.

Generally, images or graphics rendered on display 102 may be processed by a display adaptor, graphics adapter, graphics accelerator, graphics engine, graphics co-processor, a digital signal processor (DSP), a central processor, graphics processing unit (GPU), and or any other graphics hardware or software, and combinations thereof. For example, a display adaptor may include one or more graphics processing units (GPUs) and/or one or more controllers. The display adaptor may process data for graphics rendering and may convert rendered patterns (e.g., bitmap) into signals for display 102 screen. This is but one high-level example of how images may be rendered on display 102 screen; an embodiment is not limited by how images are rendered on display 102.

Figures 2, 4:
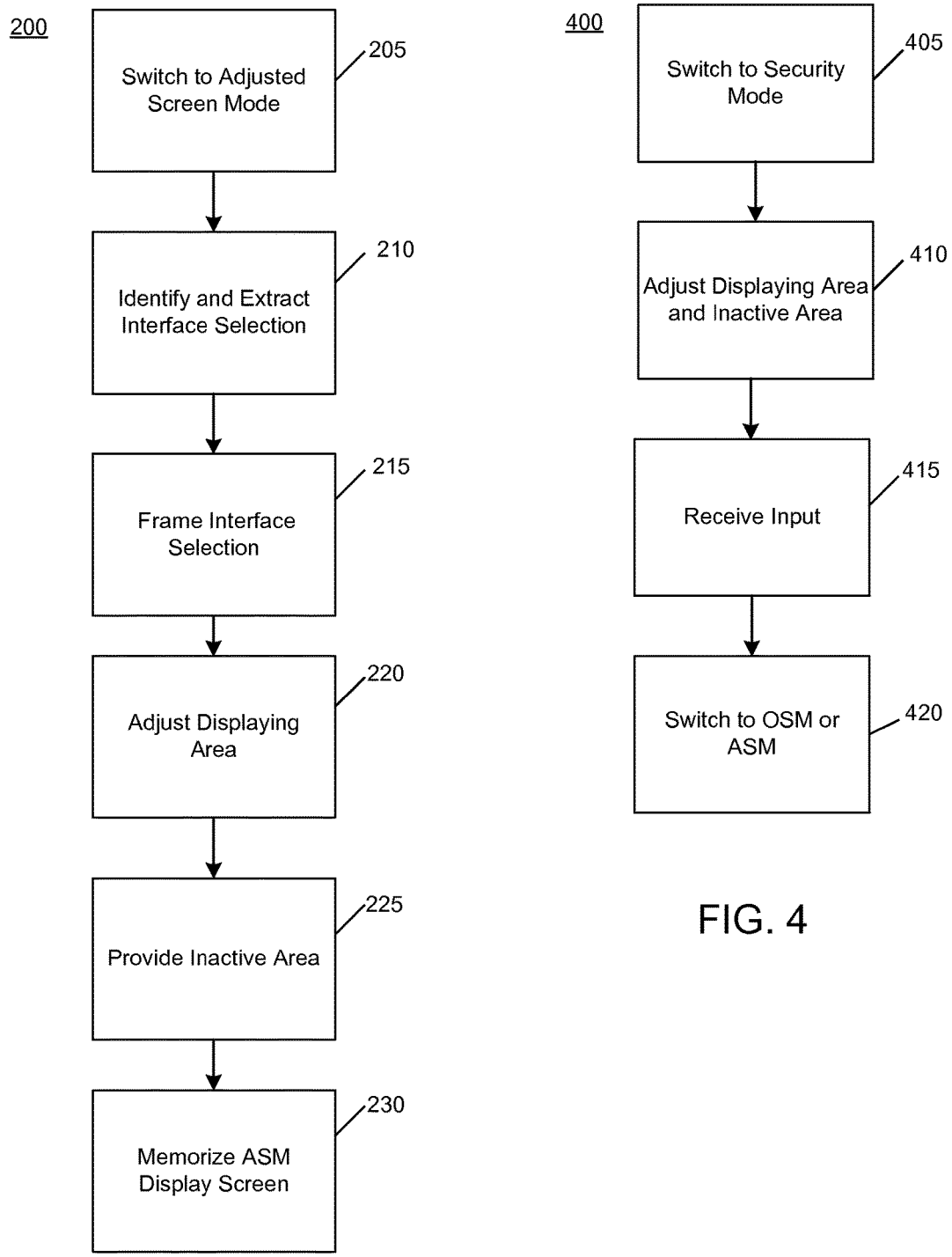
FIG. 2 includes a flow chart for a process in an embodiment of the invention.
FIG. 4 includes a flow chart for a process in an embodiment of the invention.

Referring now to FIG. 2, shown is a flowchart for a process 200. In an embodiment, process 200 may be a software module (e.g., display adjustment module) incorporated into the operating system (OS) of a mobile platform or another platform. Additionally, an embodiment of process 200 may use more or less than all of the operations shown in FIG. 2, use a different sequence of operations, and/or use different combinations of operations.

To initiate process 200, display 102 may be switched from OSM to ASM, as is shown in block 205. Display 102 may be switched from OSM to ASM in response to a user command, such as input received from the touch screen, accelerometer, or gyroscope. Switching from OSM to ASM may also be in response to user input received from a keyboard, menu selection, mouse clicks, and the like.

In an embodiment, display 102 may also be automatically switched from OSM to ASM, such as if selected by the user as the default display 102 mode or in response to detecting that the battery is has reached a predetermined threshold. For example, if the battery reaches a capacity that is at or below a certain percentage of total battery capacity (e.g., 30%, 25%, 20%, 15%, 10%, 5%) display 102 may be automatically switched from OSM to ASM to conserve the remainder of the battery power. Furthermore, display 102 may be instructed to take on an ASM configuration (e.g., size/placement of reduced size displaying area and inactive area) determined to use the least amount of battery while still being of benefit to the user. In an embodiment, display 102 screen configuration responsive to a determination of a low battery may be a default configuration or one that is preconfigured by the user. Additionally, the threshold battery level at which display 102 is switched to ASM may be a default value or a value designated by the user.

In response to switching into ASM, the initial display 102 screen may or may not automatically change. For example, in response to switching from OSM to ASM, the initial display 102 screen may take on a previously memorized configuration (e.g., FIG. 1B-FIG. 1E). The previously configured ASM display 102 screen may be a default screen or a user-defined screen. Alternatively, if an ASM display 102 screen has not been previously configured (e.g., not yet initially set up), or to change a previously configured/memorized display 102 screen, the screen may initially appear as it did in OSM (e.g., FIG. 1A). In an embodiment, to configure or reconfigure the screen for ASM, a wizard may guide the user through the configuration/reconfiguration, or the user may configure the screen through a sequence of menu choices. In an embodiment, the wizard/menus may be accompanied by audio and/or visual prompts, feedback, instructions, alerts, etc. The wizard/appropriate menu may automatically appear, or the user may access the wizard/menu via touch screen command or sensor input (e.g., accelerometer, gyroscope); by menu, icon, text selection, or the like; or by voice command, and combinations of the forgoing.

Referring to block 210, if the user is setting up ASM for the first time, or is changing a previously memorized display 102 screen, the display adjustment module may identify and extract an interface selection from the remainder of the interface. For example, in FIG. 1B clock area 106 was selected and extracted, in FIG. 1C the complete display screen was selected and extracted, and in FIG. 1D and FIG. 1E, image 108a was selected and extracted.

The display adjustment module may detect or identify an interface selection by any means; an embodiment is not limited by selecting technique. For example, in an embodiment, touch screen data may be analyzed and interpreted to identify the interface selection. Generally, a user may select all or part of an interface to be extracted for ASM by touching a particular image or area around an image such as clock area 106, image 108a, image 108b, image 108c, or image 108d. Alternatively, user may touch two points on the display 102 screen to select a geometric area defined by the two points. For example, a user may touch two opposing corners of an image 108a, 108b, 108c, 108d, clock area 106, or two opposing points on the display 102 screen such as the upper right corner and lower left corner to select the complete display 102 screen. An embodiment, however, is not limited to touch screen input; other selecting techniques such as highlighting, pointing, voice command, and the like may be analyzed and interpreted to identify an interface selection to extract for ASM. The identified selection of the interface may be extracted from the remainder of the interface for display in an adjusted displaying area (e.g., 104b-104e).

Initially, the display adjustment module may cause the extracted interface selection to be framed by a displaying area (i.e., "frame size displaying area"), as indicated in block 215. As one example, in response to a select or extract instruction, the display adjustment module may cause displaying area 104a to automatically resize (if need be) to a frame size display area to frame the selected extract of an interface. As another example, the display adjustment module may cause displaying area 104a to resize (if need be) to a frame size displaying area according to analyzed and interpreted touch screen input such as pinching and/or pulling of displaying area 104a. For example, displaying area 104a (e.g., FIG. 1A) may resize (automatically or manually) to frame an extract of clock area 106 (e.g., FIG. 1B) or an extract of selected image 108a (FIG. 1D, FIG. 1E). If the entire visible interface on display 102 screen is selected and extracted (e.g., FIG. 1A) the displaying area 104*a* already frames the extracted selection and may not resize to a different frame size displaying area.

Referring now to block 220, the display adjustment module may cause a frame size displaying area to be adjusted or further adjusted such as by repositioning, reducing, enlarging and/or stretching. For example, the display adjustment module may cause a frame size displaying area to be adjusted in response to input from a touch screen, keyboard, mouse, voice command, and the like.

Figure 1B:
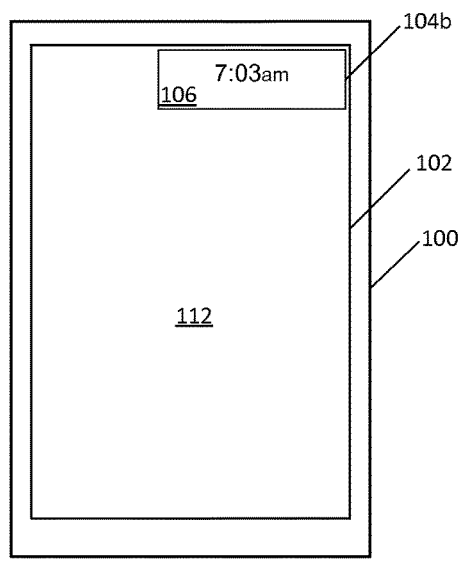
FIG. 1B includes a schematic of an embodiment of the invention.

Referring now to FIG. 1A and FIG. 1B, clock area 106 was selected and extracted from the original user interface, and framed by frame size/reduced size displaying area 104*b*. Displaying area 104*b*, hence clock area 106, has been further adjusted by being repositioned to the upper right of the display screen. Such repositioning may be by any technique such as drag and drop, which may or may not be implemented by touch screen. But for repositioning, clock area 106 may have been displayed in its original screen position within displaying area 104*b*. Moreover, in this example the frame size displaying area and the reduced size displaying area are the same size.

In an alternative embodiment, an original user interface may be repositioned on the display 102 screen and then be selected, extracted, and framed. For example, the original interface may be moved within displaying area 104*a* so that clock area 106 is at the upper right of the display 102. The repositioned clock area 106 may then be selected, extracted and framed by displaying area 104*b* such that the displaying area 104*b* may not need to be further adjusted to achieve the same result.

Figure 1C:
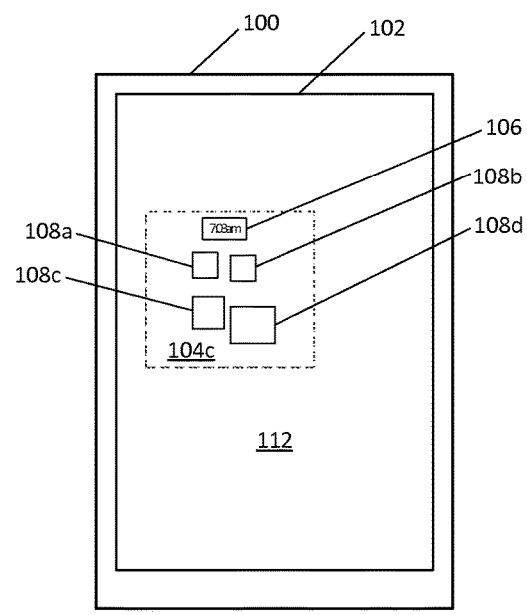
FIG. 1C includes a schematic of an embodiment of the invention.
Figure 1D:
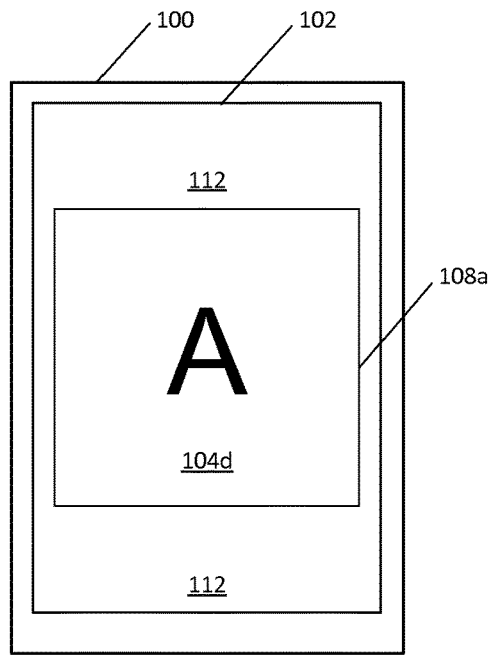
FIG. 1D includes a schematic of an embodiment of the invention.
Figure 1E:
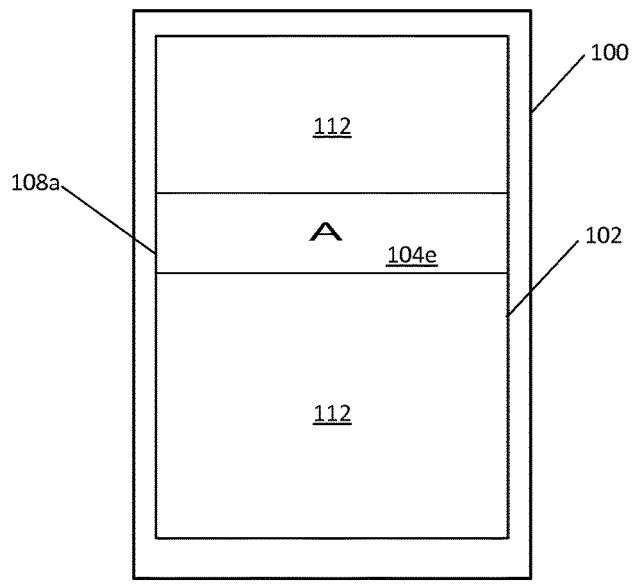
FIG. 1E includes a schematic of an embodiment of the invention.

Now referring to FIG. 1A and FIG. 1C, the entire user interface visible on display 102 screen was selected and extracted from the original interface. As the complete visible portion of the interface was selected and extracted, displaying area 104*a* initially need not be resized (e.g., the frame size displaying area is the same size as displaying area 104*a*). But to conserve battery power, displaying area 104*a*, hence the extract of the complete visible interface, should be reduced in size such as to reduced size displaying area 104*c*. In an embodiment, the user may receive notification when displaying area 104*a*/104*c* has been reduced to a size that may decrease display 102 consumption of battery power. Notifications may be visual and/or audio.

Frame size displaying area 104*a* may be reduced to a desired reduced size displaying area 104*c* (e.g., a percent of the original size) using any reducing technique. Reducing techniques include, without limitation, on a touch screen using one or more fingers to pinch together opposite corners of the displaying area 104*a*/104*c*, selecting a bar on a sliding scale, or pulling in a corner of the adjusted displaying area 104*a*/104*c* with a cursor or the like. Reducing techniques may reduce the extract of the interface so that it keeps the same proportions while simulated in small scale. Reduced size displaying area 104*c* may be enlarged by an action opposing the action taken for reduction.

The dashed line shown in FIG. 1C marks the perimeter of the extract of the interface/reduced size displaying area 104*c*. In an embodiment, the perimeter of reduced size displaying area 104*c* may not be obvious to the user as the area between images 108*a*, 108*b*, 108*c*, and 108*d* and clock area 106 may be categorized as inactive area 112. In an embodiment however, the background (e.g., wallpaper) may not be replaced by inactive area, hence the perimeter of reduced size displaying area 104*c* may be discernible to the user.

Now referring to FIG. 1A and FIG. 1D, image 108*a* was selected and extracted from the original interface, and was framed by a frame size displaying area that frames only image 108*a* in its original position on the display 102 screen. The frame size displaying area, hence image 108*a*, were further adjusted by being enlarged to reduced size displaying area 104*d*. Although enlarged, reduced size displaying area 104*d* is still smaller than displaying area 104*a*, and as such, is a reduced size displaying area. Reduced size displaying area 104*d* may be enlarged by any enlargement technique, which generally may be opposite a reducing technique. For example, on a touch screen the user may have used one or more fingers to pull one or more corners of the adjusted displaying area, until it reached the desired size (e.g., percent increase from the original size). In an embodiment, the user may receive a warning notification or alert if reduced size displaying area 104*d* is enlarged to a size that no longer enables decreased power consumption by display 102. Such a state may be reached if the extract of the user interface is enlarged to fill all or almost all of the display 102 screen so that little if any inactive area 112 is provided. A warning notification may be audio and/or visual.

Now referring to FIG. 1A and FIG. 1E the image 108*a* was selected and extracted from the original user interface to be framed by frame size displaying area. Instead of enlarging the extract of image 108*a*, the user stretched the sides of the frame size displaying area, hence image 108*a*, the width of the screen to result in reduced size displaying area 104*e*. As the stretched displaying area 104*e* is smaller than the displaying area 104*a*, it is a reduced size displaying area. Reduced size displaying area 104*e* may be stretched in a way that is similar to reducing or enlarging as discussed above. For example, on a touch screen the user may use one finger to pull one side of frame size displaying area 104*e* away from the opposing side or use two fingers to pull opposite sides of the image 108*a* simultaneously away from each other. Either pulling technique may stretch displaying area 104*e* by the desired degree. If warranted, a warning signal, alert, or notification may be issued if a degree of stretch is reached that would provide minimal or no power saving benefit. A stretched image may be compressed by an action opposite the action taken to stretch the reduced size displaying area 104*e*. For example, on a touch screen, the user may pinch his or her fingers together to reduce the stretch/shrink reduced displaying area 104*e* hence image 108*a*. Stretching is different from reducing and enlarging as the proportions of the image 108*a* may change from the original proportions. An embodiment is not limited by the technique used to stretch displaying area 104*e*. Although not shown, an image may be compressed or shrunk, which may be achieved by an opposite action from stretching.

In use, a frame size displaying area that frames an extract of a user interface may be stretched, enlarged, reduced, repositioned and the like to result in a reduced size displaying area. Such adjusting may continue until the user is satisfied with a resultant reduced size displaying area.

Referring to block 220, the display adjustment module may cause the inactive area to be provided on the display 102. Generally, the inactive area corresponds to the display 102 screen that is not being used to display the extract of the interface in the frame size/reduced size displaying area. In other words, pixels addressed for displaying the extract of the interface and corresponding frame size/reduced size displaying area may be active. In contrast, pixels in the inactive area may not be addressed to display the extract of the user interface and corresponding displaying area; and as such are inactive. Thus, in an embodiment, the inactive area corresponds to an area of inactive pixels. The inactive area may also correspond to an area where one or more display lights are selectively dimmed or turned off. This area may or may not correspond to the area of inactive pixels. In other words, pixels in the inactive area do not necessarily have to be inactive if one or more display lights are sufficiently selectively dimmed or turned off to obtain a power-saving effect. But the combination of inactive pixels/subpixels and one or more display lights that are selectively dimmed/turned off may provide optimal power savings in an embodiment.

In an embodiment, the inactive area may be provided in response to receiving an extraction or cut instruction. As such, the inactive area may dynamically change together with displaying area changes/adjustments. In an embodiment, the inactive area may be provided after the frame size displaying area is configured to a reduced size displaying area (e.g., resized, repositioned, stretched, etc.), for example in response to a sufficiently long pause or stop (e.g., 1, 2, or 3 seconds), or a save command.

Examples of inactive area 112 are shown in FIGS. 1B-1E. For example, in FIG. 1B, reduced size displaying area 104b may be repositioned. Thus, inactive area 112 may be provided while the frame size displaying area was in its original position and dynamically change as the frame size displaying area is moved from its original position to the end position. Alternatively, inactive area 112 may be provided in response to the position of displaying area 104b being saved, in response to a sufficiently long pause, or stop in displaying area 104b repositioning.

In the example of FIG. 1C, inactive area 112 may be provided in response to reducing frame size displaying area 104a to reduced size displaying area 104c and may dynamically increase in size as frame size displaying area 104a shifts to reduced size displaying area 104c. Alternatively, inactive area 112 may be provided in response to a pause or stop in reducing movement, or a save command. In the example of FIG. 1D, inactive area 112 may be provided in response to the extracting or framing of image 108a. As such, the inactive area 112 may dynamically decrease in size as the frame size displaying area is increased in size to reduced size displaying area 104d. Alternatively, the inactive area 112 may be provided in response to a pause or stop in the enlargement of displaying area 104d or a save command. As with other examples, the inactive area 112 shown in FIG. 1E may be provided in response to the extracting or framing of image 108a. As such, inactive area 112 may dynamically decrease as the displaying area 104e is stretched. Alternatively, the inactive area 112 may be provided in response to detecting that stretching has stopped or paused or in response to a save command.

Referring now to block 230, the display adjustment module may memorize the display 102 screen. For example, if there is a pause or stop in the adjusting of a displaying area, or if the pause or stop has occurred for a threshold time (e.g., 1, 2, or 3 seconds) the display adjustment module may memorize the ASM display 102 screen. For example, the position and size of the displaying area and contents and the position and size of the inactive area may be saved or remembered. Additionally or alternatively, if the display 102 has been instructed to save in response to a user command, the display adjustment module may memorize the saved ASM display 102 screen configuration. The memorized display 102 screen may be displayed until a triggering event occurs. Thus, the memorized display 102 screen, including the memorized displaying area and memorized inactive area are temporarily static (e.g., not being repositioned or otherwise changed).

Figure 3:
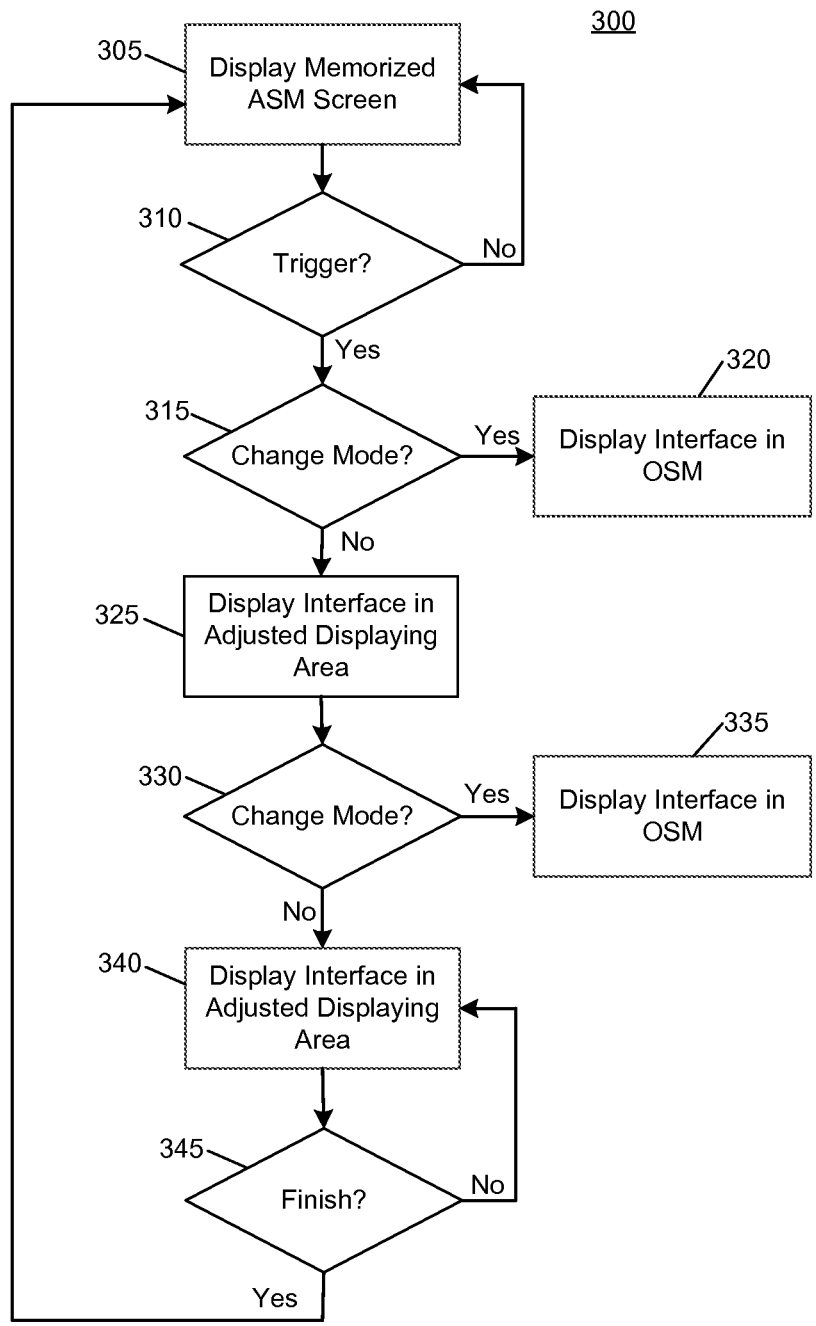
FIG. 3 includes a flow chart for a process in an embodiment of the invention.

Referring now to FIG. 3, shown is a flowchart for a process 300. In an embodiment, process 300 may be included in display adjustment module. An embodiment of process 300 may use more or less than all of the operations shown in FIG. 3, use a different sequence of operations, and/or use different combinations of operations.

Referring to block 305, while in ASM, a memorized ASM screen (e.g., memorized displaying area and inactive area) may be displayed on display 102 screen. In an embodiment, display 102 operations (if any) may be functional within adjusted reduced size displaying area 104b, 104c, 104d, or 104e of the memorized ASM screen. For example, if extracted interface image 108a displayed in memorized reduced size displaying area 104d or 104e is a selectable icon, the user may select image 108a to activate a PED 100 feature (e.g., camera, GPS) or an application program. In contrast, memorized inactive area 112 may be disabled or non-responsive to display 102 operations. For example, if the user tries to input a touch command in inactive area 112, PED 100 may not respond. In an embodiment however, a designated portion of inactive area 112 (not shown) may have limited sensitivity to a touch command to enable display of a main menu, ASM menu, or another menu, or the like. As such, the memorized ASM screen may be used to initiate a triggering event.

In diamond 310, display adjustment module may determine if a triggering event has occurred. Many different events may constitute a triggering event. For example, a triggering event may include a manual input for disabling ASM, selecting an image such as an icon, identifying a need to use a virtual device such as a keyboard, input for changing the memorized ASM screen (e.g., reposition, readjust, or make a different selection from the user interface to extract), entering a security mode, and others. A particular triggering event may be a default triggering event or a user-defined triggering event. In diamond 310, if the event is not a triggering event, the process may return to block 305. If, however, the event is a triggering event, the process may continue to diamond 315.

Using selecting icon 108a as an example of activating a PED 100 feature or application, in diamond 315 the display adjustment module may cause the display 102 to automatically switch to OSM (block 320) so that a full sized, functioning user interface for the activated feature/application program is displayed (e.g., displaying area 104a). Such automatic full-size display may result from a default setting or a setting configured by the user. Referring back to diamond 315, if the display 102 is not automatically switched to OSM, process 300 may continue in block 325. Referring to block 325, the display adjustment module may cause the user interface for the selected feature/application program (e.g., a home screen or the like) to be displayed in a reduced size within the memorized adjusted displaying area 104c, 104d, or 104e of the memorized ASM screen. From this configuration, the user may opt to exit ASM. As such, in diamond 330 the display adjustment module may determine that ASM should be switched to OSM. In block 335, the full size, functioning interface for the activated feature/application program to continue to be displayed. Referring back to diamond 330, if the user does not opt to switch to OSM, the display adjustment module may cause the user interface for the selected feature/application program to be simulated in reduced size in the memorized adjusted displaying area 104c, 104d, or 104e (block 340). Referring to block 340, the user may use a functional user interface for the feature/application program in a simulated, reduced size while the display is in ASM. Referring to diamond 345, if the user is finished, the display adjustment module may cause the display 102 to return to displaying the previously displayed memorized ASM display screen (block 305). Although not shown in FIG. 3, in an embodiment, the adjusted display module may cause the display 102 to return to the previously displayed memorized ASM screen (e.g., block 305) in response to finishing with the feature/application interface in OSM.

Now using modification of the memorized ASM display screen as an example, referring to diamond 315, the display adjustment module may automatically cause the display 102 to switch to OSM. Referring to block 320, in OSM, the original interface may be displayed (e.g., 104a) so that the user may make a desired modification according to an embodiment of process 200. Referring back to diamond 315, if the display adjustment module does not cause the display 102 to automatically switch to OSM, then the process may continue to block 325. Referring to block 325, the display adjustment module may cause the display 102 to stay in ASM and display the original interface in the reduced size, memorized adjusted displaying area. Referring to diamond 330, the user may manually opt to switch from ASM to OSM. In response to a user command to switch to OSM, display adjustment module may make the switch to allow the original interface to be displayed in full screen (block 335). From there, the user may make changes/modifications according to an embodiment of process 200. Referring back to diamond 330, if the user does not manually opt to switch to OSM, the process may continue in ASM. Referring to block 340, the display adjustment module may continue to cause the original interface to be displayed in the memorized adjusted displaying area (e.g., 104c) where the user may make desired changes. Alternatively, the display adjustment module may cause an original sized portion of the interface to be displayed in the adjusted displaying area. The user may make any desired changes to the original interface by panning, scrolling, zooming in, and/or zooming out within the confines of the adjusted displaying area. As another alternative, the display adjustment module may cause the original interface to be displayed in full screen while in ASM (e.g., displaying area 104a) so that the user does not have to switch to OSM and then back to ASM to complete an embodiment of process 200. In diamond 345, if the display adjustment module determines that the user is finished making changes, the display adjustment module may return to block 305 to display the newly memorized ASM screen. If the display adjustment module determines that the user is not finished, the process 300 may return to block 340.

An embodiment of the present invention contemplates a third display mode such as a security mode. A flowchart for a security mode process 400 is shown in FIG. 4. In an embodiment, process 400 may be included in display adjustment module. An embodiment of process 400 may use more or less than all of the operations shown in FIG. 4, use a different sequence of operations, and/or use different combinations of operations.

Referring to block 400, the display adjustment module may cause the display 102 to switch to security mode from either OSM or ASM. In an embodiment, the display adjustment module may cause the display 102 enter security mode automatically in response to detecting that sensitive input such as a password, security code, or other confidential information may need to be provided.

As shown in block 410, the display adjustment module may cause a virtual input device (e.g., virtual keyboard) to be displayed in an adjusted displaying area and cause all or almost all of the remainder of the display screen 102 to be inactive area 112. If the display 102 is switched to security mode from ASM, the virtual input device may be displayed in the memorized adjusted displaying area. Alternatively, the virtual input device may be displayed in an adjusted displaying area corresponding to the original size of the virtual input device or even to an adjusted displaying area that is larger than the original size of the virtual input device. If switched to security mode from OSM, the virtual input device may be displayed in an adjusted displaying area corresponding to the original size of the virtual input device or another default configuration, such as an adjusted displaying area that is larger than the original size of the virtual input device. Regardless of how an virtual input device is displayed in an adjusted displaying area, inactive area 112 may replace all or part of the remainder of the display 102 screen, including what would have been displayed as the input area (e.g., one or more text boxes, fields, windows or the like).

Referring to block 415, the user may use the virtual device to input sensitive information without the sensitive information being observed by unintended viewers.

In block 420, the display adjustment module may switch back to its starting module in response to detecting that user is done with security mode. In an embodiment, the display adjustment module may automatically switch back to OSM or ASM. The user, however, may manually switch out of security mode.

While in ASM, an embodiment of the invention contemplates PED 100 leaving an active mode of operation and entering a sleep mode or a hibernate mode, shutting down, or entering into another power-saving mode. When PED 100 exits such a power saving mode (e.g., waking up, powering on) back to an active operation mode, the display 102 may return to ASM to display the memorized display screen (e.g., memorized adjusted displaying area and inactive area). In an embodiment, however, exiting a power-saving mode may be a triggering event that causes the display 102 automatically to switch OSM, hence display the original interface (e.g., FIG. 1:104a).

In an embodiment of the present invention, a portable electronic device may utilize an adjusted screen mode to conserve power such as battery charge without the need to dim the entire display or to turn the display completely off.

Figure 5:
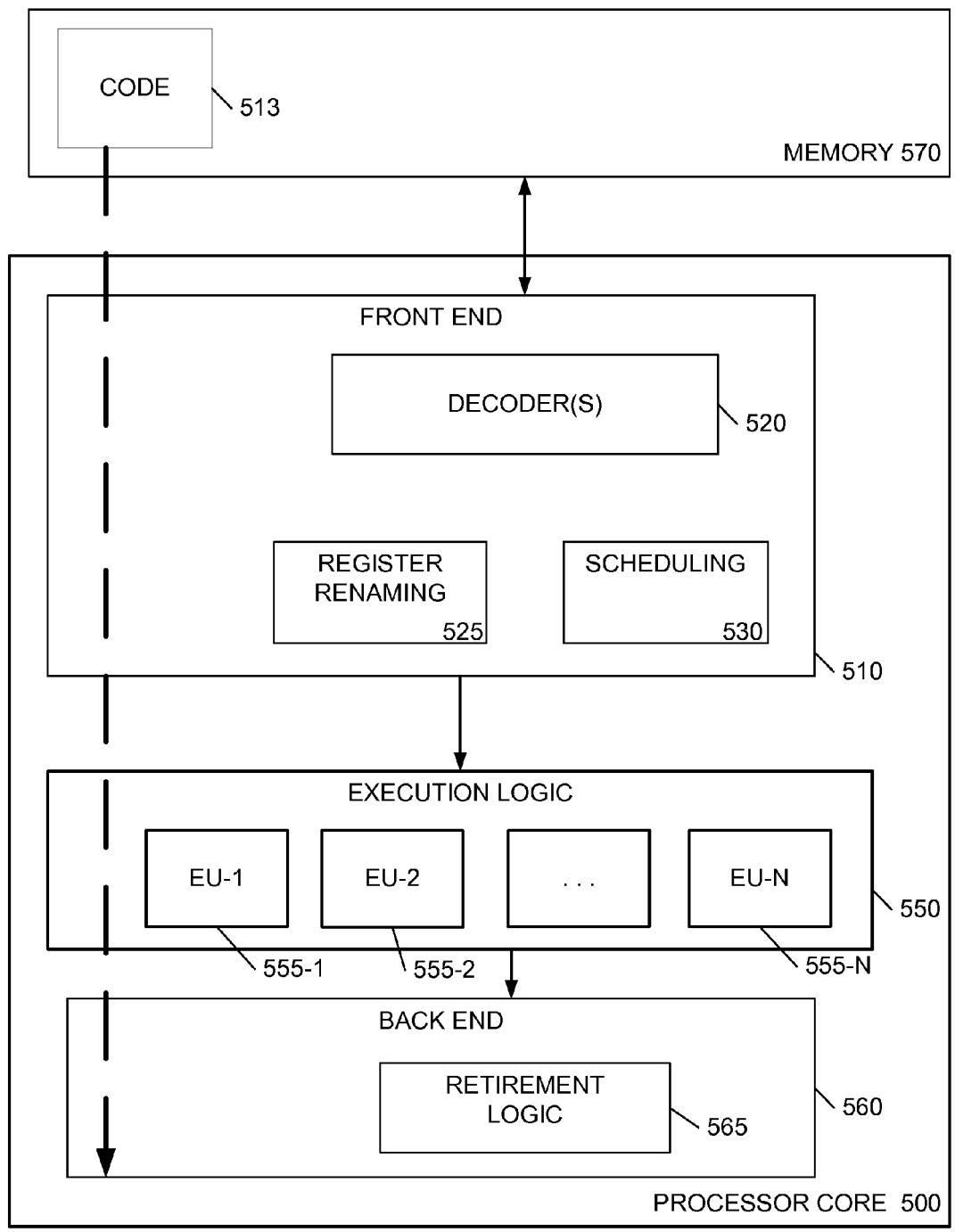
FIG. 5 includes a block diagram of a processor in an embodiment of the invention.

FIG. 5 illustrates a processor core 500 according to an embodiment. Processor core 500 may be the core for any type of processor, such as a micro-processor, an embedded processor, a digital signal processor (DSP), a network processor, or other device to execute code. Although only one processor core 500 is illustrated in FIG. 5, a processing element may alternatively include more than one of the processor core 500 illustrated in FIG. 5. (See, e.g., multi-core embodiments in FIGS. 6 and 7, below). Processor core 500 may be a single-threaded core or, for at least one embodiment, the processor core 500 may be multithreaded in that it may include more than one hardware thread context (or "logical processor") per core.

FIG. 5 also illustrates a memory 570 coupled to the processor 500. The memory 570 may be any of a wide variety of memories (including various layers of memory hierarchy) as are known or otherwise available to those of skill in the art. The memory 570 may include one or more code instruction(s) 513 to be executed by the processor 500. The processor core 500 follows a program sequence of instructions indicated by the code 513. Each instruction enters a front end portion 510 and is processed by one or more decoders 520. The decoder may generate as its output a micro operation such as a fixed width micro operation in a predefined format, or may generate other instructions, microinstructions, or control signals, which reflect the original code instruction. The front end 510 also includes register renaming logic 525 and scheduling logic 530, which generally allocate resources and queue the operation corresponding to the convert instruction for execution.

The processor 500 is shown including execution logic 550 having a set of execution units 555-1 through 555-N. Some embodiments may include a number of execution units dedicated to specific functions or sets of functions. Other embodiments may include only one execution unit or one execution unit that can perform a particular function. The execution logic 550 performs the operations specified by code instructions.

After completion of execution of the operations specified by the code instructions, back end logic 560 retires the instructions of the code 513. In an embodiment, the processor core 500 allows out of order execution but requires in order retirement of instructions. Retirement logic 565 may take a variety of forms as known to those of skill in the art (e.g., re-order buffers or the like). In this manner, the processor core 500 is transformed during execution of the code 513, at least in terms of the output generated by the decoder, the hardware registers and tables utilized by the register renaming logic 525, and any registers (not shown) modified by the execution logic 550.

Although not illustrated in FIG. 5, a processing element may include other elements on chip with the processor core 500. For example, a processing element may include memory control logic (see, e.g., MC 1072 of FIG. 6, below) along with the processor core 500. The processing element may include I/O control logic and/or may include I/O control logic integrated with memory control logic (see, e.g., CL 1182 of FIG. 7, below). The processing element may also include one or more caches.

Figure 6:
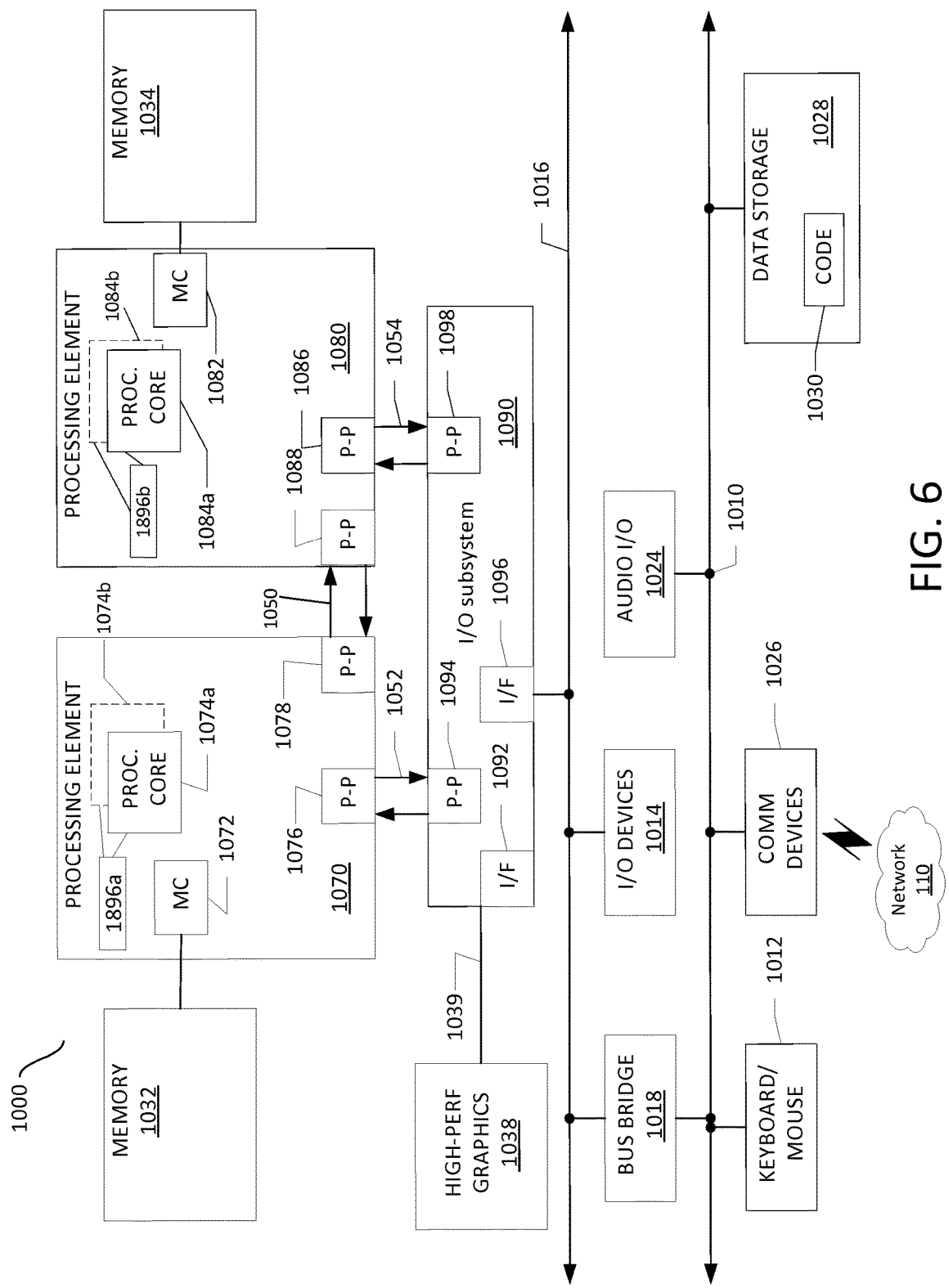
FIG. 6 includes a block diagram of a system for in an embodiment of the invention.

Referring now to FIG. 6, shown is a block diagram of a system embodiment 1000 in accordance with an embodiment of the present invention. Shown in FIG. 6 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 10 may be implemented as multi-drop bus rather than point-to-point interconnect.

As shown in FIG. 6, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 5.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While MC logic 1072 and 1082 is illustrated as integrated into the processing elements 1070, 1080, for alternative embodiments the MC logic may be discrete logic outside the processing elements 1070, 1080 rather than integrated therein.

First processing element 1070 and second processing element 1080 may be coupled to an I/O subsystem 1090 via P-P interconnects 1052 and 1054, respectively. As shown in FIG. 6, I/O subsystem 1090 includes P-P interfaces 1094 and 1098. Furthermore, I/O subsystem 1090 includes an interface 1092 to couple I/O subsystem 1090 with a high performance graphics engine 1038, a point-to-point interconnect 1039 may couple these components.

In turn, I/O subsystem 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 6, various I/O devices 1014 may be coupled to first bus 1016, along with a bus bridge 1018, which may couple first bus 1016 to a second bus 1010. In one embodiment, second bus 1010 may be a low pin count (LPC) bus. Various devices may be coupled to second bus 1010 including, for example, a keyboard/mouse 1012, communication device(s) 1026 (which may in turn be in communication with the network 110), and a data storage unit 1028 such as a disk drive or other mass storage device which may include code 1030, in one embodiment. The code 1030 may include instructions for performing an embodiment described herein. Further, an audio I/O 1024 may be coupled to second bus 1010.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

Figure 7:
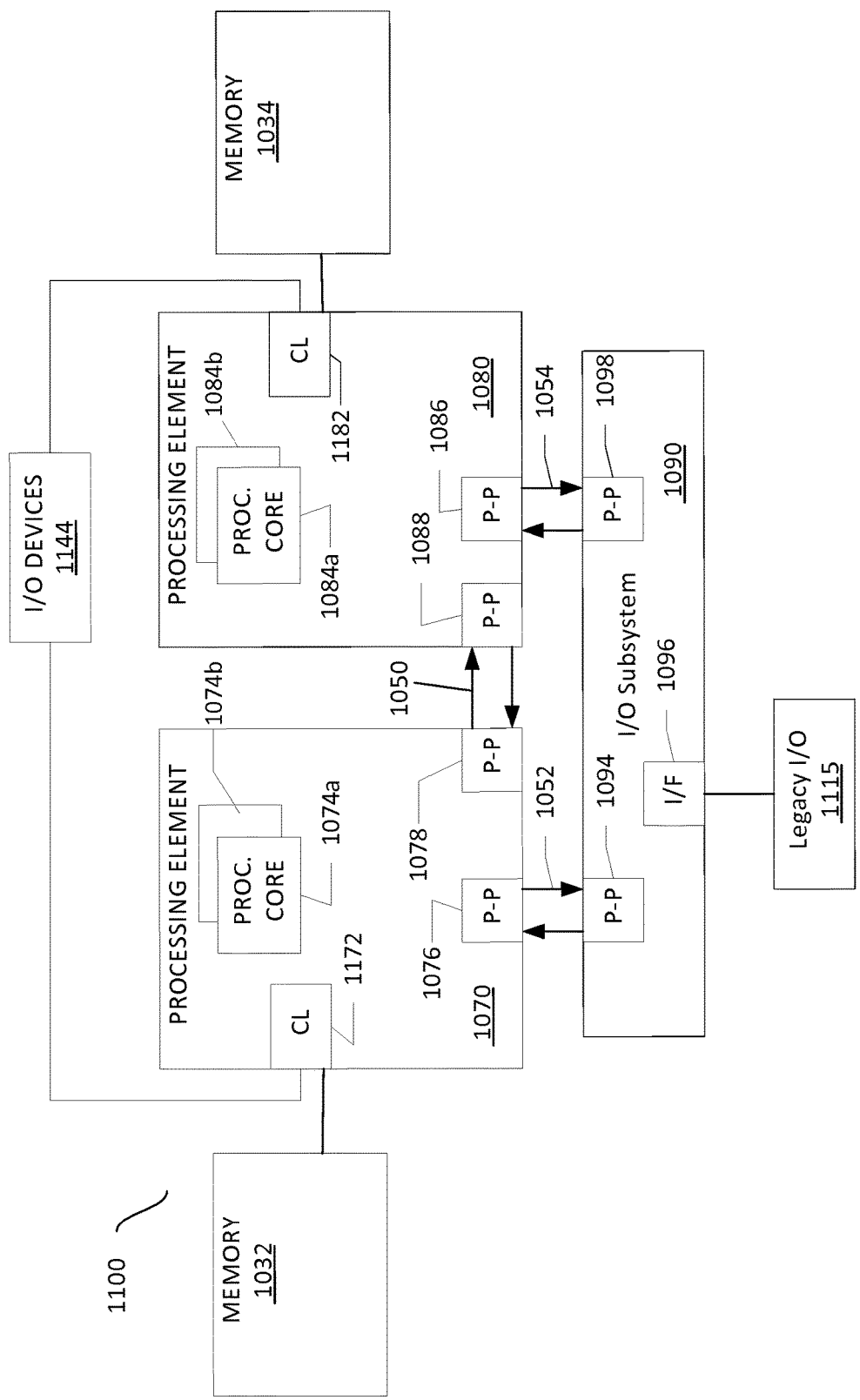
FIG. 7 includes a block diagram of system in an embodiment of the invention.

Referring now to FIG. 7, shown is a block diagram of a third system embodiment 1100 in accordance with an embodiment of the present invention. Like elements in FIGS. 6 and 7 bear like reference numerals, and certain aspects of FIG. 6 have been omitted from FIG. 7 in order to avoid obscuring other aspects of FIG. 7.

FIG. 7 illustrates that the processing elements 1070, 1080 may include integrated memory and I/O control logic ("CL") 1172 and 1182, respectively. For at least one embodiment, the CL 1172, 1182 may include memory control logic (MC) such as that described above in connection with FIG. 6. In addition, CL 1172, 1182 may also include I/O control logic. FIG. 7 illustrates that not only are the memories 1032, 1034 coupled to the CL 1172, 1182, but also that I/O devices 1114 may also be coupled to the control logic 1172, 1182. Legacy I/O devices 1115 may be coupled to the I/O subsystem 1090.

The computer systems depicted in FIGS. 6 and 7 are schematic illustrations of embodiments of computing systems, which may be utilized to implement various embodiments discussed herein. It will be appreciated that various components of the systems depicted in FIGS. 6 and 7 may be combined in a system-on-a-chip (SoC) architecture.

Figure 8:
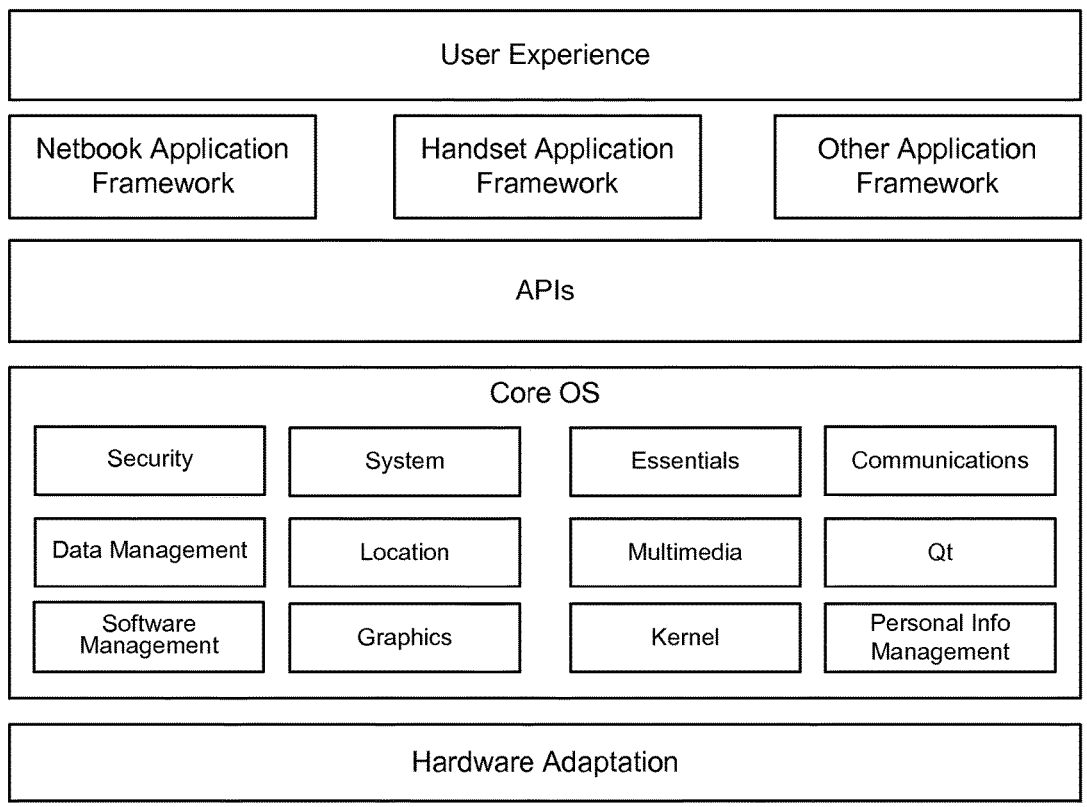
FIG. 8 includes a block diagram of functional components for use in an embodiment of the invention.

The diagram of FIG. 8 illustrates functional components of an embodiment of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Figure 9:
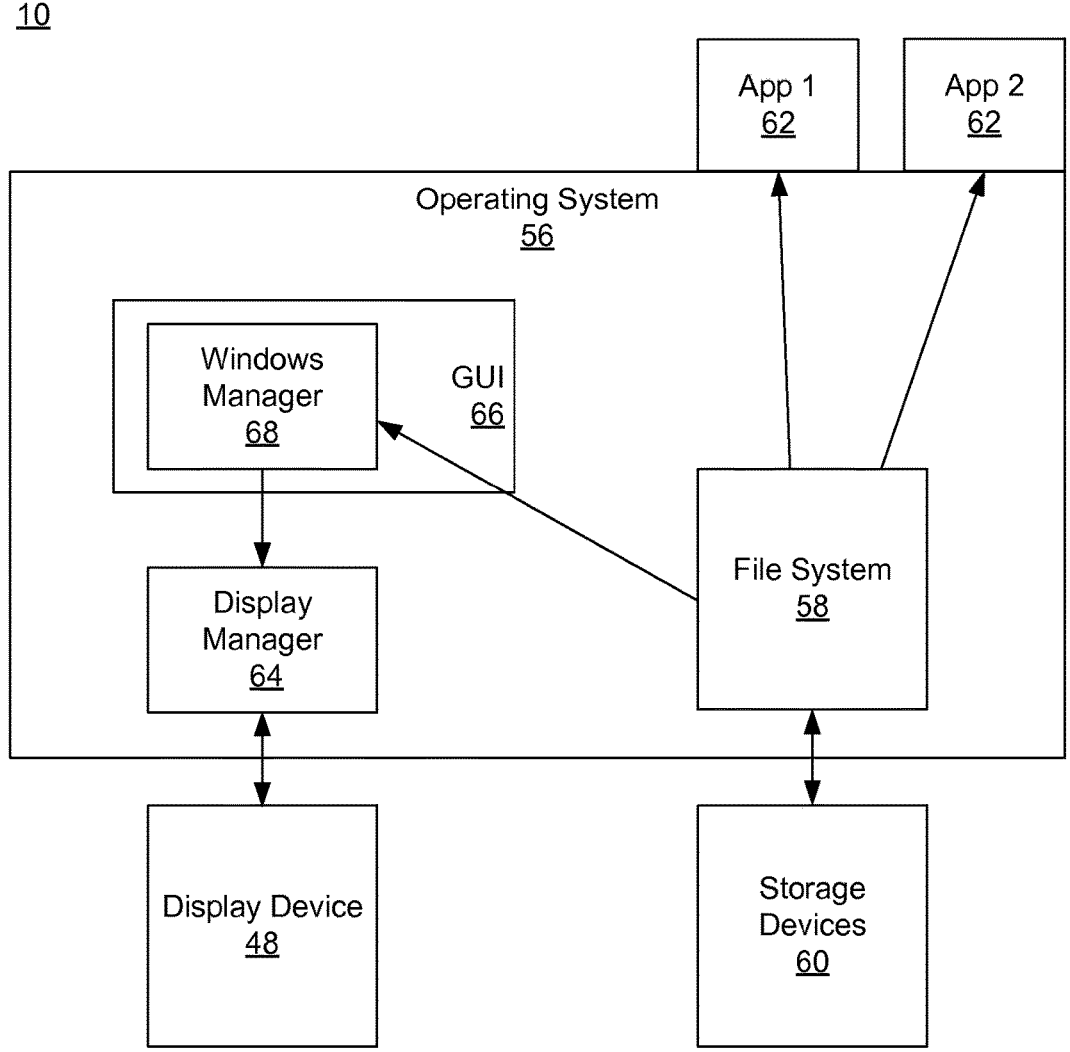
FIG. 9 includes a schematic illustrating how information can be displayed in an embodiment of the invention.

FIG. 9 is a schematic block diagram 10 showing how information can be displayed to a user of a compute node in an embodiment of the invention. For example, an operating system 56 can include a display manager 64, which may control information that is presented to a display device 48 (e.g., without limitation, a touch screen) for display to the user. A graphical user interface 66 is another component of the operating system 56 that interacts with the display manager 64 to present information on the display device 48. For example, the graphical user interface 66 can provide the display manager 64 with data that describes the appearance and position of windows, icons, control elements, and similar types of user interface objects. The graphical user interface 66 might provide this information directly to the display manager 64, or via a windows manager 68. The windows manager 68 can control the display of windows in which data is presented to the user. Such data may be documents generated by application programs 62, or the contents of a file system 58, storage device 60, or both.

Figure 10:
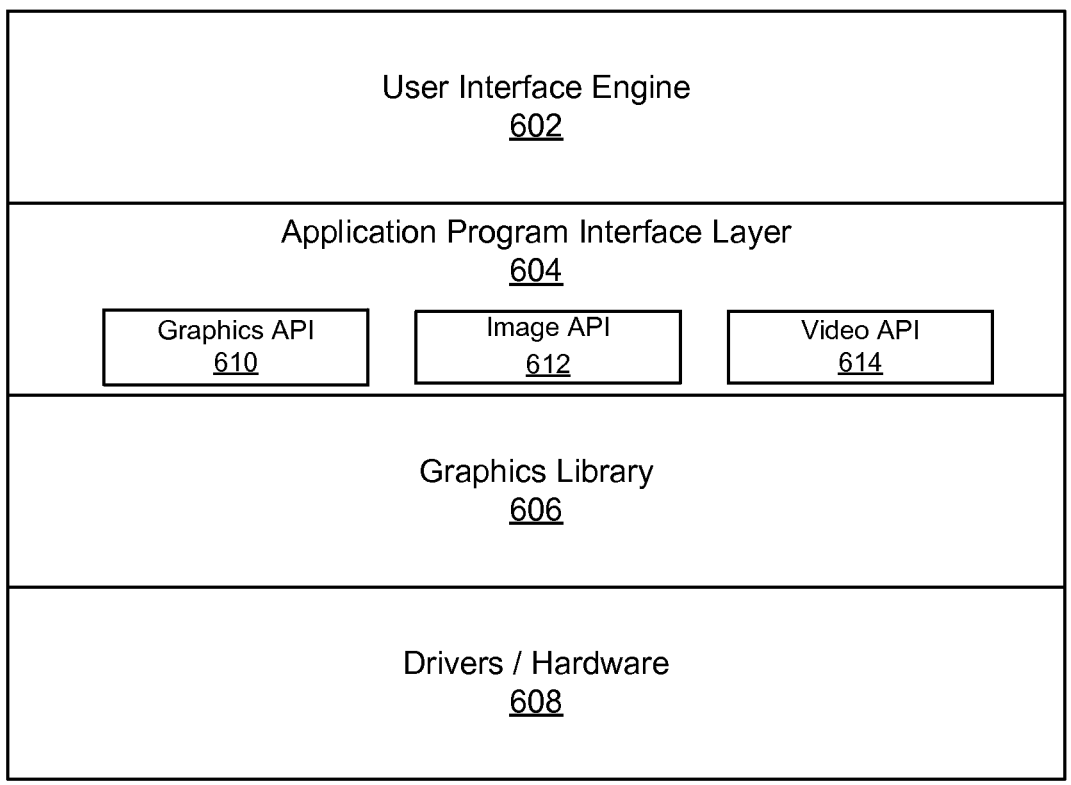
FIG. 10 includes a block diagram of a system layer structure for use in an embodiment of the invention.

FIG. 10 is a block diagram of an example system layer structure 600 that can be utilized to implement an embodiment described herein. Other system layer implementations, however, can also be used. In some implementations, a user interface engine, such as the UI engine 602, or another UI engine capable of generating a three-dimensional user interface environment, operates at an application level 602 and implements graphical functions and features available through an application program interface (API) layer 604. Example graphical functions and features include graphical processing, supported by a graphics API 610, image processing, support by an imaging API 612, and video processing, supported by a video API 614. The API layer 604, in turn, interfaces with a graphics library layer 606. The graphics library layer 604 can be implemented, for example, as a software interface to graphics hardware, such as an implementation of the OpenGL specification. A driver/hardware layer 608 includes drivers and associated graphics hardware, such as a graphics card and associated drivers.

An embodiment may be implemented in program code, or instructions, which may be stored in, for example, volatile and/or non-volatile memory, such as storage devices and/or an associated machine readable or machine accessible medium including, but not limited to floppy disks, optical storage, solid-state memory, hard-drives, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a medium through which the program code may pass, such as antennas, optical fibers, communications interfaces, etc. Program code may be transmitted in the form of packets, serial data, parallel data, etc., and may be used in a compressed or encrypted format.

An embodiment of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. Additionally, an embodiment may include processes that use greater than or fewer than all of the disclosed operations, use the same operations in a different sequence, or use combinations, subdivisions, or other alterations of individual operations disclosed herein.

In an embodiment, use of the term control logic includes hardware, such as transistors, registers, or other hardware, such as programmable logic device; control logic may also include software or code, which may be integrated with hardware, such as firmware or micro-code. A processor or controller may include control logic intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like.

The following examples pertain to further embodiments. Specifics in the examples may be used anywhere in one or more embodiments.

Example 1 may include subject matter such as, a system or a portable electronic device enabled to display an interface on a display screen, the system or portable electronic device to include at least one processor that may perform a method or execute a computer program comprising, in an original screen mode of a display screen, displaying a user interface in an original size displaying area; switching from the original screen mode to an adjusted screen mode of the display screen; and in the adjusted screen mode, displaying an extract of the user interface in a reduced size displaying area, which is smaller than the original size displaying area, at least a part of the reduced size displaying area adjacent to an inactive area of the display screen, the inactive area of the display screen using less power than an equivalent area of the original size displaying area.

In Example 2, the subject matter of Example 1 may optionally include, detecting if battery power is less than a battery power threshold, and if less than the battery power threshold, automatically switching from the original screen mode to the adjusted screen mode In Example 3, the subject matter of Example 2 may optionally include the battery power threshold being a predetermined percent of a maximal battery power.

In Example 4, the subject matter of Examples 1, 2, or both may optionally include, creating the extract by extracting a selection from the user interface, and adjusting the original size displaying area to a frame size that frames just the extract in the extract's original position on the display screen.

In Example 5, the subject matter of Examples 1, 2, and/or 4, may optionally include, identifying the selection from the user interface as the user interface is displayed in the original screen mode, the identified selection either a whole of the displayed user interface or a portion thereof.

In Example 6, the subject matter of any of the above examples may optionally include, repositioning the frame size displaying area from the original position on the display screen to a different position on the display screen, or adjusting the frame size displaying area to the reduced size displaying area, or both, wherein adjusting the frame size displaying area to the reduced size displaying area comprises, relative to the frame size displaying area, enlarging, reducing, stretching, enlarging and stretching, or reducing and stretching.

In Example 7, the subject matter of Example 6 may optionally include, providing an alert to indicate that the frame size displaying area has been reduced to a reduced size displaying area that enables the inactive area of the display screen to use less battery power than the equivalent area of the original size displaying area, or providing an alert to indicate that the frame size displaying area has been enlarged or stretched to a reduced size that causes the inactive area of the display screen to use at least the same amount of battery power than the equivalent area of the original size displaying area.

In Example 8, the subject matter of Examples 1, 2, 4, 5, 6, and/or 7 may optionally include responding to a touch screen input corresponding to a position within the extract, and not responding to a touch screen input corresponding to a position in the inactive area of the display screen.

In Example 9, the subject matter of Example 1, 2, 3, 4, 5, 6, 7, and/or 8 may optionally include displaying the display of the adjusted screen mode, and automatically switching out of the adjusted screen mode in response to a triggering event selected from the group consisting of: manually disabling adjusted screen mode, selecting an image representative of an application program or a hardware feature, identifying an attempt to change the configuration of the reduced size displaying area, and switching to a security mode.

In Example 10, the subject matter of Examples 1, 2, 3, 4, 5, 6, 7, and/or 8 may optionally include responsive to a user selection of an image representative of an application program or a hardware feature and displayed in the extract, displaying a primary user interface for the selected application program or hardware feature in a reduced size in the reduced size displaying area.

In Example 11, the subject matter of Example 10 may optionally include, in response to exiting the application program or use of the hardware feature, returning to the adjusted screen mode.

In Example 12, the subject matter of Examples 1 through 11 may optionally include switching from the original screen mode or the adjusted screen mode to a security screen mode, the display screen in the security screen mode displaying only a virtual input device and an inactive area.

In Example 13, the subject matter of Example 12 may optionally include, displaying only the virtual input device includes displaying the only the virtual input device in a displaying area that frames an original size virtual input device, a larger-than-original size virtual input device, or a smaller, reduced size virtual input device.

Example 14 can include the subject matter of any of the forgoing examples and may also include, causing the at least one processor to go to from a higher power state in the adjusted display mode to a lower power state and turning off the display, and in response to causing the at least one processor to return to the higher power state in the adjusted display mode, causing the display screen to be in the adjusted screen mode.

Example 15 can include the subject matter of any of the forgoing examples and can also include, providing less variable electrical charge to a plurality of contiguous pixels in the inactive area of the display screen than is applied to the same plurality of contiguous pixels when the display screen is in the original screen mode.

Example 16 can include the subject matter of Example 15 and can include, providing no variable electrical charge.

Example 17 can include the subject matter of Example 15 or 16 and include, selectively dimming or turning off one or more display lights proximate the inactive area of the display screen.

Example 18 can include a communications device arranged to carry out a method according to any one of Examples 1 through 16.

Example 19 can include at least one machine readable medium comprising a plurality of instructions that in response to being executed on a computing device, cause the computing device to carry out a method according to any one of Examples 1 through 16.

Example 20 can include an apparatus comprising means for performing a method of any one of Examples 1 to 16.

Example 21 can include the subject matter of Example 20 and can include active matrix organic light emitting diode display.

Example 22 may include subject matter such as, a method, a system, or a device such as a portable electronic device, enabled to display an interface on a display screen, and may include at least one processor to, control switching a display screen between an original screen mode and an adjusted screen mode, the original screen mode to include displaying, on a display screen, a user interface in an original size displaying area, the adjusted screen mode to include displaying, on the display screen, an extract of the user interface in a reduced size displaying area that is smaller than the original size displaying area and to include an inactive area of the display screen, the inactive area of the display screen using less power than an equivalent area of the original size displaying area.

Example 23 may include the subject matter of Example 22 and may optionally include automatically switching from original screen mode to adjusted screen mode in response to detecting that battery power has reached a predetermined minimum percent of batter power.

Example 24 include subject matter such as, a method, a system, or a device such as a portable electronic device or a display device that includes a display screen to switch between displaying in an original screen mode and in an adjusted screen mode, the original screen mode to include a user interface displayed in an original size displaying area, the adjusted screen mode to include an extract of the user interface displayed in a adjusted displaying area that is smaller than the original size displaying area and an inactive area that uses less power than an equivalent area of the original size displaying area. In an optional variation of Example 24, the display device may include the inactive area while displaying in adjusted screen mode.

Example 25 includes the subject matter of claim 24, and optionally includes, while displaying in adjusted screen mode, the inactive area results from one of: supplying less variable electrical charge to a plurality of contiguous pixels in the inactive area of the display screen than is applied to the same plurality of contiguous pixels when the display screen is in the original screen mode, providing no variable electrical charge to the plurality of contiguous pixels in the inactive area of the display screen, selectively dimming or turning off one or more display lights proximate the inactive area of the display screen, and supplying less variable electrical charge to a plurality of contiguous pixels in the inactive area of the display screen than is applied to the same plurality of contiguous pixels when the display screen is in the original screen mode and selectively dimming or turning off one or more display lights proximate the inactive area of the display screen.

All optional features of apparatus(es) described above may also be implemented with respect to method(s) or process (es) described herein.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   in an original screen mode of a display screen, displaying a user interface in an original size displaying area;
   switching from the original screen mode to an adjusted screen mode of the display screen that includes an extract of the user interface, wherein when the switching is user-directed, the extract of the user interface is to be created based on first user input comprising a user selection of a portion of the user interface to be extracted for the adjusted screen mode, the first user input received during an adjusted screen mode configuration;
   in the adjusted screen mode, displaying the extract of the user interface in a reduced size displaying area, which is smaller than the original size displaying area, at least a part of the reduced size displaying area adjacent to an inactive area of the display screen, the inactive area of the display screen using less power than an equivalent area of the original size displaying area;
   responsive to detection of an interruption in the first user input, displaying a partially adjusted screen display that includes a partial extract of the user interface until a trigger event is initiated and upon initiation of the trigger event, resuming creation of the extract of the user interface; and
   switching from the adjusted screen mode to a security screen mode, the display screen in the security screen mode displaying a virtual input device in the reduced size displaying area to enable the user to input sensitive information without observation by an unintended viewer.

2. The method of claim 1 wherein switching includes, detecting if battery power is less than a battery power threshold, and if less than the battery power threshold, automatically switching from the original screen mode to the adjusted screen mode.

3. The method of claim 1 further comprising, creating the extract by extracting a selection from the user interface, and adjusting the original size displaying area to a frame size that frames the extract in the extract's original position on the display screen.

4. The method of claim 3, further comprising, repositioning the frame size displaying area from the original position on the display screen to a different position on the display screen, or adjusting the frame size displaying area to the reduced size displaying area, or both, wherein adjusting the frame size displaying area to the reduced size displaying area comprises, relative to the frame size displaying area, enlarging, reducing, stretching, enlarging and stretching, or reducing and stretching.

5. The method of claim 4 further comprising, providing an alert to indicate that the frame size displaying area has been reduced to a reduced size displaying area that enables the inactive area of the display screen to use less battery power than the equivalent area of the original size displaying area.

6. The method of claim 4, further comprising providing an alert to indicate that the frame size displaying area has been enlarged or stretched to a reduced size displaying area that causes the inactive area of the display screen to use at least the same amount of battery power than the equivalent area of the original size displaying area.

7. The method of claim 1 further comprising, responding to a touch screen input corresponding to a position within the extract, and not responding to a touch screen input corresponding to a position in the inactive area of the display screen.

8. The method of claim 1 further comprising, continuously displaying the display of the adjusted screen mode, and automatically switching out of the adjusted screen mode in response to a triggering event selected from the group consisting of: manually disabling the adjusted screen mode, selecting an image representative of an application program or a hardware feature, identifying an attempt to change the configuration of the reduced size displaying area, and switching to the security screen mode.

9. The method of claim 1 further comprising, responsive to a user selection of an image representative of an application program or a hardware feature and displayed in the extract, displaying a primary user interface for the selected application program or hardware feature in a reduced size in the reduced size displaying area.

10. The method of claim 1, further comprising causing at least one processor to go from a higher power state in the adjusted screen mode to a lower power state and turning off the display screen, and in response to causing the at least one processor to return to the higher power state in the adjusted screen mode, causing the display screen to be in the adjusted screen mode.

11. The method of claim 1 further comprising, selectively dimming, or turning off one or more display lights proximate the inactive area of the display screen.

12. The method of claim 1, wherein the partially adjusted screen display includes a modified inactive area that includes a trigger region to initiate the trigger event responsive to second user input.

13. The method of claim 12, further comprising upon resumption of the creation of the extract, displaying the extract of the user interface adjacent to the inactive area responsive to creation of the extract of the user interface.

14. The method of claim 1, further comprising displaying the virtual input device having a different size than an original size of the virtual input device.

15. The method of claim 14, wherein the virtual input device comprises a virtual keyboard.

16. A system comprising:
at least one processor and control logic coupled to the at least one processor, the at least one processor to:
control switching a display screen between an original screen mode and an adjusted screen mode, the original screen mode to include displaying, on the display screen, a user interface in an original size displaying area, the adjusted screen mode to include displaying, on the display screen, an extract of the user interface in a reduced size displaying area that is smaller than the original size displaying area and to include an inactive area of the display screen, the inactive area of the display screen using less power than an equivalent area of the original size displaying area, wherein when the switching is user-prompted the extract of the user interface is to be created based on first user input comprising a user selection of a portion of the user interface to be extracted for the adjusted screen mode, the first user input received during an adjusted screen mode configuration;
responsive to an interruption in the first user input, display on the display screen a partially adjusted screen mode display that includes a partially created extract until a trigger event is initiated; and
control switching from the adjusted screen mode to a security screen mode, the display screen in the security screen mode to display a virtual input device in the reduced size displaying area to enable the user to input sensitive information without observation by an unintended viewer.

17. The system of claim 16, wherein the at least one processor is to automatically switch from the original screen mode to the adjusted screen mode in response to detecting that battery power has reached a predetermined minimum percentage of battery power.

18. The system of claim 16, wherein the partially adjusted screen display includes a modified inactive area that includes a trigger region to enable initiation of the trigger event responsive to second user input.

19. The system of claim 18, wherein responsive to a touch command detected via the trigger region, the display screen is to display a menu that enables initiation of the trigger event.

20. The system of claim 16, wherein the at least one processor is to display the virtual input device having a different size than an original size of the virtual input device, the virtual input device comprising a virtual keyboard.

21. A display device comprising:
a display screen to switch between display in an original screen mode, an adjusted screen mode, a partially adjusted screen mode, and a security screen mode, the original screen mode to include a user interface displayed in an original size displaying area, the adjusted screen mode to include an extract of the user interface displayed in an adjusted displaying area that is smaller than the original size displaying area, the extract of the user interface to be created based on first user input comprising a user selection of a portion of the user interface to be extracted for the adjusted screen mode, the first user input received during an adjusted screen mode configuration, and the partially adjusted screen mode to include a partial extract of the user interface and a modified inactive area that includes a trigger region to enable initiation of a trigger event responsive to user input;
while in the adjusted screen mode, the display device to include an inactive area that uses less power than an equivalent area of the original size displaying area;
wherein responsive to an interruption in creation of the extract of the user interface, the display screen is to display in the partially adjusted screen mode, and upon initiation of the trigger event the display screen is to display in the adjusted screen mode responsive to receipt of extract display data corresponding to the extract of the user interface; and
wherein in the security screen mode, the display screen is to display a virtual input device in the reduced size displaying area to enable the user to input sensitive information without observation by an unintended viewer.

22. The display device of claim 21 wherein, while displaying in adjusted screen mode, the inactive area results from one of: supplying less variable electrical charge to a plurality of contiguous pixels in the inactive area of the display screen than is applied to the same plurality of contiguous pixels when the display screen is in the original screen mode, providing no variable electrical charge to the plurality of contiguous pixels in the inactive area of the display screen, selectively dimming or turning off one or more display lights proximate the inactive area of the display screen, and supplying less variable electrical charge to a plurality of contiguous pixels in the inactive area of the display screen than is applied to the same plurality of contiguous pixels when the display screen is in the original screen mode and selectively dimming or turning off one or more display lights proximate the inactive area of the display screen.

23. The display device of claim 21, wherein responsive to a touch command detected via the trigger region, the display screen is to display a menu to initiate the trigger event.

* * * * *